US005337480A

United States Patent [19]

Codikow

[11] Patent Number: 5,337,480

[45] Date of Patent: Aug. 16, 1994

[54] SUBDIVIDING DEVICE

[76] Inventor: Ralph Codikow, 9021 Exposition Blvd., Los Angeles, Calif. 90034

[21] Appl. No.: 58,944

[22] Filed: May 7, 1993

[51] Int. Cl.[5] .............. A47J 17/00

[52] U.S. Cl. .............. 30/114; 83/437; 83/857; 99/538; 99/545

[58] Field of Search .............. 30/114, 299, 302, 303, 30/314, 315, 316; 83/856, 857, 858, 932, 167, 437; 99/537, 538, 543, 545

[56] References Cited

U.S. PATENT DOCUMENTS

| | | | |
|---|---|---|---|
| 1,040,582 | 10/1912 | Rickert | 83/857 |
| 2,329,918 | 9/1943 | Leavens . | |
| 2,495,770 | 1/1950 | Rivet . | |
| 2,852,053 | 9/1958 | Berry et al. . | |
| 2,912,757 | 11/1959 | Knight . | |
| 3,468,355 | 9/1969 | Hall . | |
| 3,830,151 | 8/1974 | Gerson | 99/537 |
| 4,095,518 | 6/1978 | Jones | 99/538 |
| 4,372,184 | 2/1983 | Fisher et al. | 83/98 |
| 4,436,025 | 3/1984 | Jones | 99/538 |
| 4,569,280 | 2/1986 | D'Ambro et al. | 99/538 |
| 4,841,642 | 6/1989 | Kunishima | 30/303 |
| 4,959,903 | 10/1990 | Daoust et al. | 30/123.5 |
| 5,069,100 | 12/1991 | Jackson | 83/857 |
| 5,101,718 | 4/1992 | Lin | 99/545 |

*Primary Examiner*—Richard K. Seidel
*Assistant Examiner*—Hwei-Siu Payer
*Attorney, Agent, or Firm*—Harris F. Brotman

[57] ABSTRACT

A device for subdividing a workpiece, typically a citrus fruit, into segments. The device comprises a blade support structure having an opening with a plurality of blades sharpened on two edges projecting from the circumferential surface of the opening toward the middle to juxtapose attacking points and edges forming a channel through which a plunger mechanism urges the workpiece into contact with the attacking points and sharpened edges thereby subdividing the workpiece into segments.

15 Claims, 3 Drawing Sheets

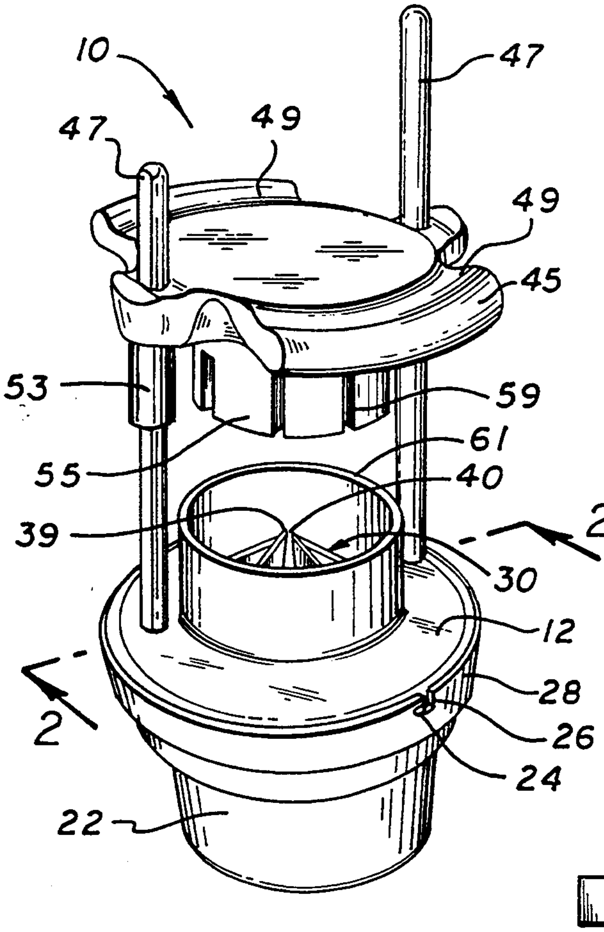
FIG. 1
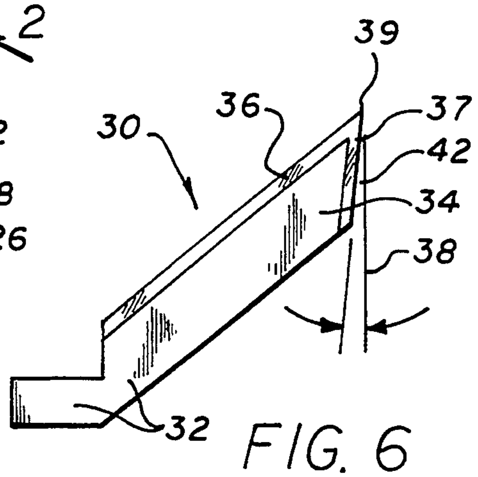
FIG. 6
FIG. 5
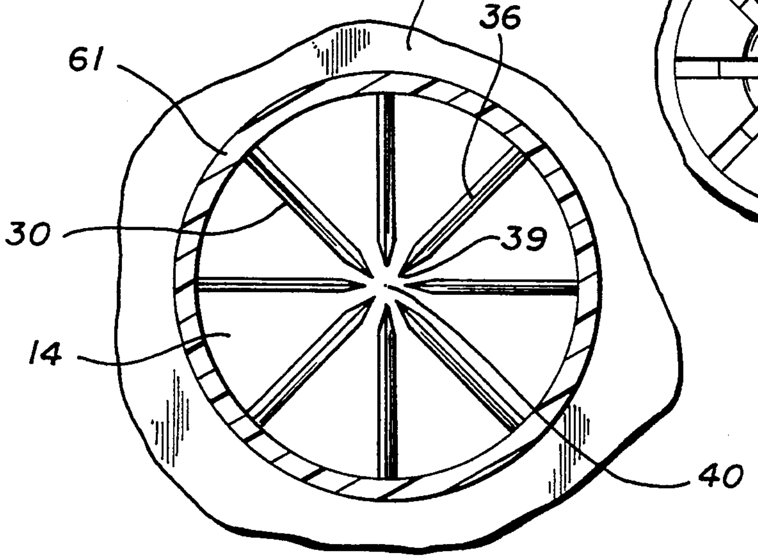
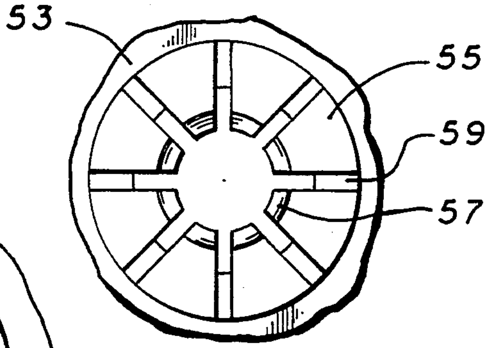
FIG. 4

SUBDIVIDING DEVICE

BACKGROUND OF THE INVENTION

1. Field of the Invention

This invention relates to devices for subdividing or sectioning a rounded food workpiece. In particular, this invention relates to a device for subdividing or slicing a fruit or vegetable into segments.

2. Description of Related Art

Numerous patents, including U.S. Pat. Nos. 4,959,903, 4,569,280, 2,852,053 and 3,830,151, have proposed and described various devices for slicing, dividing, or separating workpieces like citrus fruits, vegetables such as tomatoes, and the like.

These devices typically employ relative movement between an array of blades and pushing elements for forcing a workpiece or food article into contact with the blades for sectioning. These devices are suitable for sectioning a wide variety of tough-skinned, rounded food articles ranging from soft interiors (tomatoes) to firm interiors (citrus fruit).

A persistent problem with these devices, however, is the unintentional juicing of the food article when it is forced through the blades.

SUMMARY OF THE INVENTION

In accordance with the present invention, a device is provided for subdividing a workpiece, particularly a rounded food article, into segments, which overcomes the above-mentioned problem and provides a device for subdividing citrus or other fruits and vegetables without juicing them.

The present invention is a device for subdividing a workpiece into segments, and comprises a blade support structure, a plurality of blades, and means for urging the workpiece into contact with the blades for subdividing the workpiece into segments.

The blade support structure has an opening, and the opening has a circumferential surface. Projecting into the opening, the blades each have a proximal end and a distal end, and each blade is anchored or embedded in the circumferential surface at its proximal end. Each blade has an upwardly facing leading edge and a fall-off edge. The leading and fall-off edges are sharpened. At the distal end of each blade is located the fall off edge. The junction of the leading edge and fall off edge forms an attacking point at the distal end. The fall-off edge extends from the attacking point downwardly and circumferentially, that is, away from an axis extending from the attacking point and perpendicular to the horizontal plane of the opening. The attacking points are spaced apart and define an expanding channel between the attacking points. The attacking points are also for positioning the workpiece in the device.

The means for urging the workpiece into contact with the attacking points for subdividing the workpiece into segments comprises a plunger means and guide means. The plunger means is for reciprocal, that is, back and forth movement relative to the blades by which movement the plunger means urges the workpiece into engagement with the leading edges and fall- off edges of the blades. The guide means is upstanding from the blade support structure, and controls the approach of the plunger to the workpiece.

The above discussed and many other features and attendant advantages of the present invention will become better understood by reference to the following detailed description of the invention when taken in conjunction with the accompanying drawings.

BRIEF DESCRIPTION OF THE DRAWINGS

FIG. 1 is a perspective view illustrating the front, top. side of the device.

FIG. 4 is partial fragmentary view taken on line 4—4 of FIG. 2.

FIG. 5 is a magnified, partial fragmentary view taken along line 5—5 of FIG. 2.

FIG. 6 is a perspective view of a blade detached from the device, and showing the proximal and distal ends, leading and fall-edges, and attacking point.

DETAILED DESCRIPTION OF THE INVENTION

The instant invention involves a device for subdividing a workpiece into segments. The workpiece is typically a fruit or vegetable, including but not limited to fruits and vegetables which are susceptible to juicing when subdivided into segments. Such fruits include citrus, such as lime, lemon, orange or grapefruit; or a vegetable, such as tomato.

The device provides a blade support structure having an opening with a circumferential surface, a plurality of blades anchored in the circumferential surface and having a unique arrangement of sharpened edges and attacking points, and means for urging the workpiece into contact with the attacking points for subdividing the workpiece into segments. In a typical embodiment of the invention, the blade support structure is adapted for mounting on a receptacle, such as a bowl, for receiving the segments.

Figure 2:
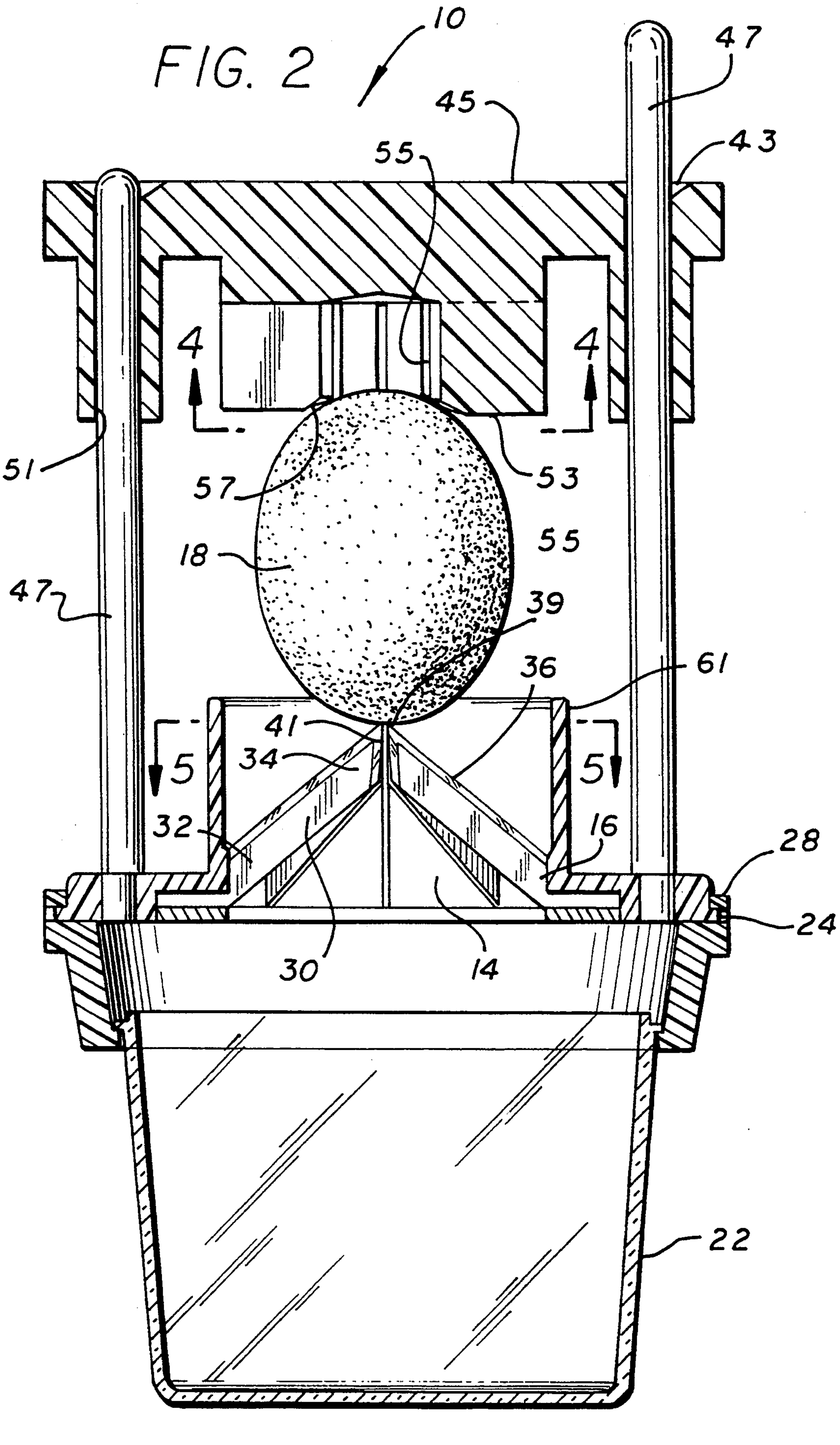
FIG. 2 is a cross-sectional view taken along line 2—2 of FIG. 1.
Figure 3:
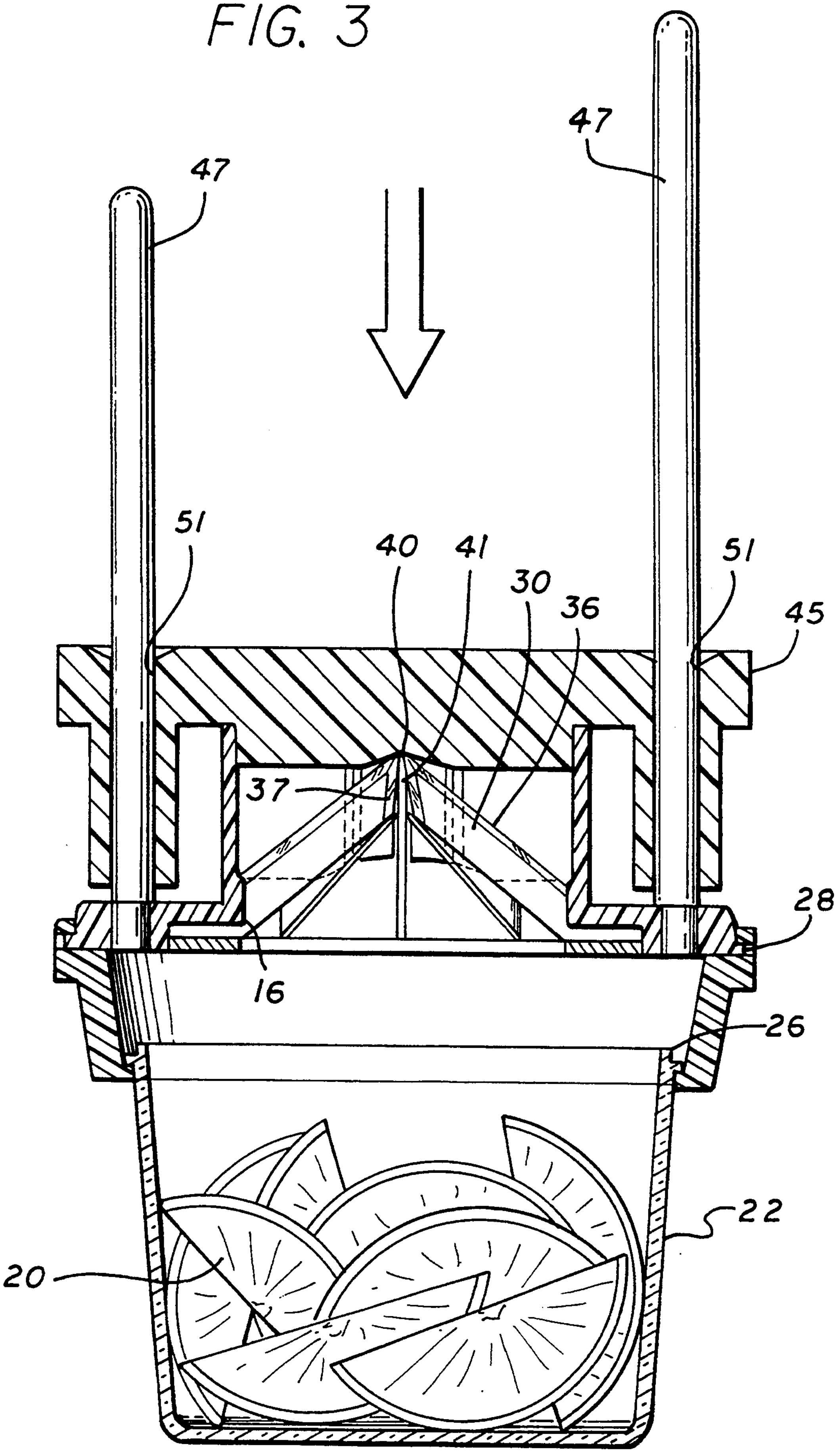
FIG. 3 is a cross-sectional view, similar to FIG. 2, showing the plunger interdigitated with the blades, having forced the workpiece into engagement with the blades and subdivided the workpiece into segments.

Referring more particularly to the drawings, FIGS. 1, 2 and 3 show the device 10 for subdividing a workpiece 18 into segments 20. The blade support structure 12 has an opening 14, and the opening 14 has a circumferential surface 16. Preferably, the blade support structure 12 is formed from plastic suitable for washing by dishwashing machine. Such plastics include polycarbonet or ABS.

The opening 14 is sized to receive a workpiece 18 and accommodate the passage of the segments 20 subdivided from the workpiece 18 by the operation of the device 10. The diameter of the opening 14 may vary from about 1 inch to about 12 inches. Typically, a diameter of about 2.5 to about 4 inches is appropriate for spherical or ovoid citrus fruits, such as limes, lemons or oranges, and vegetables such as tomatoes, which are intended to be cut by this device 10.

The blade support structure 12 of the invention can be formed for mounting on a receptacle 22 for receiving said segments 20. In an embodiment of the invention, mounting means, 24 typically projections formed in the edge of the blade support structure 12, extend from the edge of the blade support structure and engage notches 26 placed on the lip or rim of a receptacle 22 to reversibly secure the blade support structure 12 to the receptacle 22.

The device 10 of the invention further comprises a plurality of blades 30, typically formed from stainless steel, and preferably rustproof stainless steel, such as 440A stainless. Each blade 30 has a proximal end 32 and a distal end 34, and is anchored at its proximal end 32 to the circumferential surface 16 of the opening 14. In a typical construction of the device, the proximal end 32 of each blade 30 is molded into the circumferential surface 16 of the opening 14 of the blade support structure 12. This may be accomplished by injection molding where the proximal end 32 of each blade 30 is embedded approximately 0.5 inches into the circumferential surface 16 of the opening 14 .

The blades 30 extend into the opening 14 parallel to the plane of the opening 14. A preferred version of the invention cantilevers the blades 30 upwardly from the circumferential surface 16, as shown in FIGS. 1, 2, 3, and 6.

Each blade 30 comprises an upwardly facing, leading edge 36 and a fall-off edge 37, both of which are sharpened. The fall-off edge 37 is located at the distal end 34 of each blade 30. The junction of the leading edge and the fall-off edge forms an attacking point 39 at the distal end 34 of each blade 30. The fall-off edge 37 extends from the attacking point 39 downwardly, downwardly and circumferentially from an axis 38 which extends from the attacking point and is perpendicular to the horizontal plane of the opening 14. The angle 42 formed between the fall-off edge 37 and the axis extending through the attacking point and perpendicular to the horizontal plane of the opening 14 ranges from about 1.5 degrees to about five degrees, and is typically about three degrees.

The plurality of blades 30 extend into the opening 14 so as to juxtapose the attacking points 39 of the respective blades 30 a short distance from each other. The juxtaposed attacking points form an opening 40 to an expanding channel 41 defined by the fall-off edges and extending downwardly from the attacking points 39 through which the workpiece 18 passes when forced into contact with the attacking points 39 by the action of the urging means 43, facilitating the contact of the workpiece 18 with a plurality of sharpened leading edges 36 and a plurality of sharpened fall-off edges 37, thereby subdividing the workpiece 18 into segments 20.

In an embodiment of the invention where a plurality of blades 30 are radially arranged in the opening (FIGS. 1–3), the opening 40 of the expanding channel 41 ranges in diameter from about 0.01 inches to about 0.06 inches. In a typical embodiment, such as for subdividing a lime workpiece 18, the diameter of the channel opening 40 is approximately 0.02 inches.

FIGS. 1–3 illustrate an embodiment of the invented device which comprises a plurality of blades 30. The invention contemplates one or more sets of diametrically opposed blades 30, typically four sets of diametrically opposed blades as shown in FIG. 1–3 and 5, and useful for subdividing a workpiece 18 into eight approximately equal sized radial segments 20. Alternatively, the invention contemplates a plurality of blades 30 comprising one or more sets of non-diametrically opposed blades. FIG. 2 and 3 illustrate the device having four sets of diametrically opposed blades 30 in which the blades 30 are about 0.025 to 0.035 inches thick, about 0.5 to about three inches in length, and typically about 1.5 inches in length from the attacking point 39 to the circumferential surface 16, and about a half inch wide.

The present invention comprises urging means 43 for urging the workpiece 18 into contact with the attacking points 39 for subdividing the workpiece 18 into segments 20. The urging means 43, which is formed from plastic or an equivalent material, comprises plunger means 45 and guide means 47. The plunger means 45, which can be formed from molded plastic, is typically shaped with concavities 49 to allow the ridges of the thumbs and fingers to securely and comfortably grasp the plunger means 45. Guide ways 51 or sleeves are formed in the periphery of the plunger for engaging with the guide means 47 upstanding from the blade support structure 12. The guide means 47 can be formed from plastic and/or metal, such as aluminum, and, as shown in FIGS. 1–3, may be shaped as posts or pins of sufficient height to allow placement of a fruit or vegetable workpiece 18 on the attacking points 39 and subsequent stabilizing contact with the lower surface 53 of the plunger 45 before forcing the workpiece 18 through the blades 30 for segmentation.

The guide sleeves 51 engage the guide posts 47. The guide posts may comprise a taller and a shorter guide post as shown in FIGS. 1–3. The guide sleeve 51 engaged with the taller guide post may have a broached configuration which retains the plunger 45 upwardly on the taller guide post until the plunger is axially pivoted on the taller guide post and the other guide sleeve engages the other shorter guide post. When both guide sleeves 51 are engaged with both guide posts 47, the broach for retaining the plunger 45 upwardly on the taller guide post disengages, allowing the operator to push the plunger 45 down along the guide posts 47 and urge the workpiece 18 into engagement with the leading edges 36 of the blades 30 to achieve segmentation of the workpiece 18. A half-moon shaped relief formed in the guide sleeve facilitates the engagement of the shorter guide post with a guide sleeve 51. When the plunger, with one guide sleeve engaged in the taller guide post, 45 is axially rotated about the guide sleeve engagement on the taller guide post to engage the shorter guide post, the half moon relief allows the sleeve 51 to pivot over the shorter guide post, and further axial rotation travel of the plunger means 45 is obstructed by the surface of the sleeve opposite the half-moon relief.

Engagement of both guide sleeves 51 with both guide means 47 serves the purpose of controlling the approach of the plunger 45 to the workpiece 18 and allows for reciprocating movement of the plunger 45 relative to the blades 30.

The lower surface 53 of the plunger 45 is adapted for engaging the workpiece 18 and interdigitating with the blades 30 when the plunger 45 is lowered such that the lower surface 53 of the plunger 45 contacts the workpiece 18, urging the workpiece 18 into engagement with the leading edges 36 of the blades 30. As shown in FIGS. 1–3, the lower surface 53 of the plunger 45 may be shaped to form a column 55, the lower surface of which has a chamfer 57 shaped as an inside relief of the column 55, the surface of which makes contact with the workpiece 18, the chamfer 57 for engaging and centering the workpiece 18. Means for interdigitating with the blades are formed as slots 59 in the column 55.

In a typical embodiment, the invention also uses a protective wall 61 upstanding from the blade support structure 12. The protective wall 61 serves as a safety mechanism to prevent the operator's hands or fingers from damage caused by contact with the leading edges 36 or attacking points 39 of the blades 30.

With the shorter guide post located closer to the operator and the taller post positioned away, and with the plunger 45 in the up position and engaged in the guide means 47 as shown in FIG. 1, the operator positions a workpiece on the attacking points 39 of the blades 30 (FIG. 2), axially rotates the plunger means 45 for engagement of the non-engaged guide sleeve 51 with the other guide means 47, which allows the plunger means 45 to descend along the guide means 45 until the chamfer 57 of the column 55 extending from the lower surface 53 of the plunger means 45 engages the workpiece 18. The operator then presses down the plunger 45, lowering the plunger 45 guided by the guide means 47 and urging the workpiece 18 into contact with the leading 36 and fall-off 37 edges of the blades 30. The workpiece 18 is pushed through the blades 30 and cut into wedge shaped segments 20. The movement of the plunger 45 along the guide means 47 is terminated by the lower surface of the plunger contacting the upper edge of the protective wall 61.

When the plunger 45 movement is terminated, the operator has pushed the workpiece completely past the blades 30, as shown in the semi-phantom drawing off the plunger in FIG. 3. The sectioned or segmented pieces 20 fall freely. In an embodiment of the invention comprising the blade support structure 12 mounted on a receptacle 22, such as a plastic bowl or the like, the sectioned pieces 20 fall into the receptacle 22.

Although the present invention has been described in considerable detail with regard to certain preferred versions, other versions are possible. For example, the opening 14 can be made large enough with proportionally enlarged blades 30 to achieve segmentation of large workpiece 18 fruits such as watermelons, cantaloupes, and the like. It should be understood that the blade support structure 12 may be shaped not for mounting on a bowl or receptacle but instead for mounting on a frame, which frame may be positioned over other receptacles for receiving the segments.

Having thus described exemplary embodiments of the present invention, it should be noted by those skilled in the art that the disclosures herein are exemplary only and that various other alternatives, adaptations, and modifications may be made within the scope of the present invention. Accordingly, the present invention is not limited to the specific embodiments as illustrated herein, but is only limited by the following claims.

What is claimed is:

1. A device for subdividing a workpiece into segments comprising:

(a) a blade support structure having an opening, said opening having a circumferential surface;

(b) a plurality of blades, each blade comprising a proximal end and a distal end, a leading edge and a fall-off edge, said fall-off edge being located at said distal end, the junction of said leading and fall-off edges forming an attacking point at said distal end, said fall-off edge extending from said attacking point downwardly and circumferentially from an axis extending from said attacking point and perpendicular to a horizontal plane of said opening, wherein said leading edge and fall-off edge are sharpened, each blade anchored at said proximal end to said circumferential surface of said opening, said attacking points defining a channel between said attacking points and for positioning said workpiece; and (c) means for urging the workpiece into contact with said attacking points for subdividing said workpiece into segments said means for urging mounted upon said blade support structure.

2. The device of claim 1 wherein said blades are upwardly disposed.

3. The device of claim 1 wherein said plurality of blades comprise diametrically opposed blades.

4. The device of claim 1 wherein said plurality of blades comprise non-diametrically opposed blades.

5. The device of claim 1 wherein a body surrounds said opening.

6. The device of claim 5 wherein said body is formed for mounting on a receptacle for receiving said segments.

7. The device of claim 5 wherein said means for urging comprises:

(a) spaced guides upstanding from said body; and (b) a plunger which slides on said guides for reciprocating movement relative to said blades and sized for movement within said opening, wherein said plunger has a lower surface adapted for engagement with said workpiece and having an array of slots for interdigitating with said blades when said plunger urges said workpiece into engagement with said leading edges of said blades wherein said movement of said plunger forces said workpiece into engagement with said leading edges of said blades for subdividing said workpiece into segments.

8. The device of claim 1 further comprises a receptacle reversibly mounted to the blade support structure for receiving said segments.

9. The device of claim 1 wherein said channel ranges in diameter from about 0.01 inches to about 0.06 inches.

10. The device of claim 1 wherein the angle formed between the fall-off edge and an axis extends through the attacking point and is perpendicular to the horizontal plane of the opening ranges from about 1.5 degrees to about 5 degrees.

11. The device of claim 1 wherein said opening ranges in diameter from about one inch to about six inches.

12. The device of claim 11 wherein said opening has a diameter of about two and three-fourths inches.

13. The device of claim 1 wherein a protective wall upstands from said blade support structure, said wall sized for receiving said workpiece and for protecting an operator's hands and fingers from damage caused by contact with the blades.

14. The device of claim 13 further comprising a receptacle having means for mounting to said body.

15. A device for subdividing a workpiece into segments comprising:

(a) a blade support structure having an opening, said opening having a circumferential surface;

(b) a plurality of upwardly disposed and diametrically opposed blades, each blade comprising a proximal end and a distal end, a leading edge and a fall off edge, said fall off edge being located at said distal end, the junction of said leading and fall off edges forming an attacking point at said distal end, said fall off edge extending from said attacking point downwardly and circumferentially from an axis extending from said attacking point and perpendicular to a horizontal plane of the opening, wherein said leading edge and fall off edge are sharpened, each blade anchored at said proximal end to said circumferential surface of said opening, wherein said attacking points form a channel between said attacking points and for positioning said workpiece;

(c) a body surrounding said opening, said body comprising (i) spaced guides upstanding from said body (ii) mounting means for placing said body on a receptacle for receiving said segments said mounting means projecting laterally from said body;

(d) urging means comprising a plunger which slides on said spaced guides for reciprocating movement relative to said blades and sized for movement within said opening, wherein said plunger has a lower surface defining a cavity adapted for engagement with said workpiece and having an array of slots for interdigitating with said blades when said plunger urges said workpiece into engagement with said leading edges of said blades, wherein said movement of said plunger forces said workpiece into engagement with said leading edges of said blades for subdividing said workpiece into segments.

* * * * *